US006346759B1

United States Patent
Suzuki et al.

(12) United States Patent
(10) Patent No.: US 6,346,759 B1
(45) Date of Patent: Feb. 12, 2002

(54) STATOR STRUCTURE OF HIGHSPEED MOTOR

(75) Inventors: Yuzuru Suzuki; Sakae Fujitani; Taketoshi Ohyashiki; Naoyuki Harada, all of Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/491,825

(22) Filed: Jan. 26, 2000

(30) Foreign Application Priority Data

Feb. 3, 1999 (JP) .......................................... 11-026210

(51) Int. Cl.[7] .................................................. H02K 1/00
(52) U.S. Cl. ....................... 310/254; 310/216; 310/67 R
(58) Field of Search ................................. 310/49 R, 254, 310/258, 259, 67 R, 269, 216; 29/596–598

(56) References Cited

U.S. PATENT DOCUMENTS

| 3,886,256 A | * | 5/1975 | Ohuchi et al. ............... 310/216 |
| 4,187,441 A | | 2/1980 | Oney .......................... 310/112 |
| 4,394,597 A | | 7/1983 | Mas ............................ 310/268 |
| 4,578,610 A | | 3/1986 | Kliman et al. ............... 310/156 |
| 4,647,802 A | * | 3/1987 | Konecny ..................... 310/49 R |
| 4,654,552 A | * | 3/1987 | Fritzsche .................... 310/216 |
| 4,701,653 A | | 10/1987 | Merkle et al. ............... 310/152 |
| 4,959,578 A | * | 9/1990 | Varga ......................... 310/268 |
| 5,028,830 A | * | 7/1991 | Mas ............................ 310/211 |
| 5,208,503 A | * | 5/1993 | Hisey .......................... 310/259 |
| 5,457,350 A | | 10/1995 | Sakamaki et al. ........... 310/216 |
| 5,519,270 A | | 5/1996 | Yamada et al. ............. 310/67 R |
| 5,907,210 A | * | 5/1999 | Chaix .......................... 310/268 |
| 5,925,965 A | * | 7/1999 | Li et al. ...................... 310/268 |

FOREIGN PATENT DOCUMENTS

| JP | 55 017246 | 2/1980 |
| JP | 56 049653 | 5/1981 |
| JP | 60 051426 | 3/1985 |

* cited by examiner

*Primary Examiner*—Tran Nguyen
(74) *Attorney, Agent, or Firm*—Fay, Sharpe, Fagan, Minnich & McKee, LLP

(57) ABSTRACT

The present invention provides, at low cost, a stator structure of a high-performance motor, which gives off lower temperature rise, strives for a more highly efficient magnetic circuit, and achieves lower power consumption at highspeed rotation, while at the same time striving to achieve a stable rotor position by preventing rotor float at highspeed rotation. In a highspeed motor comprising a stator including a stator yoke made of a soft magnetic material and coils composed of magnet wires wound on salient poles of the stator yoke; A rotor including a field magnet includes a permanent magnet so as to face the salient poles of the stator by way of an air gap and a shaft as the center of rotation in the center thereof; and a base plate having a housing which has two bearings for rotatably holding the rotor in the center of the stator, improvement being that the stator yoke is constituted by winding a soft magnetic steel sheet.

10 Claims, 6 Drawing Sheets

STATOR STRUCTURE OF HIGHSPEED MOTOR

BACKGROUND OF THE INVENTION

1. Field of the Invention

The present invention relates to improvement in performance, that is, increasing speed of rotation, reducing vibration, decreasing power consumption, and lowering costs, of a highspeed motor such as for example spindle motor, which is used in the disk drive of a computer peripheral memory device, or an audio-visual device, which has a digital disk as a medium, of office automation (OA) equipment or audio-visual (AV) equipment, and more particularly, to a highspeed motor stator structure, which is designed to increase the efficiency of a magnetic circuit, and to enhance motor performance.

2. Description of the Related Art

FIG. 1 is a cross-sectional view of a conventional outer rotor radial gap-type highspeed motor.

A conventional highspeed motor is of an outer rotor-type with radial gap. Because a stator yoke 3 is constituted by stacking up a required number of disks made of soft-magnetic steel sheets, which constitute a salient pole 6, there is a little space for winding. Therefore winding is not possible in a separate process using a bobbin or the like. Magnet wire is directly wound on the stator yoke 3 without using the bobbin and therefore a long time is required for winding process and there will be a possible deterioration of quality caused by damages on the wire. Magnetic force of a rotor magnet 7 acts principally in the radial direction, and the magnetic force in the direction of the shaft 10 is extremely weak. As has been disclosed in various applications, even when the center of the rotor magnet is placed above the center of the shaft 10, and axial magnetic force is increased, the axial magnetic force is still weak, and when a disk is mounted to the rotor and rotated at highspeed, it is difficult to maintain the initial position of the disk. In recent trend, decrease in cost of the equipment is especially intense, and there has been a change from ball bearings to metal bearings 11 with a view to increasing the rotating speed of the disk, and reducing bearing costs. This causes difficulty in preventing the rotor from floating and more effective methods have been demanded.

As means for solving these problems, there has been proposed a salient pole-type motor with axial gap (refer to Japanese Patent Application No. 9-306771) as shown in FIGS. 2A and 2B, in which the magnetic force of the rotor magnet and the orientation of the magnetic flux as a field magnet is in the same direction to increase the axial magnetic force of the rotor.

FIG. 2A is a cross-sectional view of a conventional highspeed motor of salient pole-type with axial gap similar to the present invention, and FIG. 2B is a perspective view of a stator of the motor.

As will be readily understood in FIGS. 2A and 2B, the salient poles 6 of the stator yoke 3 have surfaces protruding in both radial and axial directions oppositely to the rotor magnet 7 fixed on a rotor yoke 8. Therefore effective magnetic flux can be extracted in abundance, thus promoting enhanced characteristics. However, because the salient poles 6 are magnetically interconnected through only a base plate 1 without any magnetic circuits provided therebetween, the length of the magnetic path becomes long, and connection points become numerous, making it easy for magnetic resistance to increase, and making it impossible to further improve characteristics. To make the stator structure more compact, smaller in diameter, and higher in performance, the magnetic circuit must be made highly efficient by suppressing increase in the magnetic resistance thereof.

SUMMARY OF THE INVENTION

With the foregoing problems in view, it is an object of the present invention to provide, at low cost, a stator structure of a high-performance motor, which gives off lower temperature rise, strives for a more highly efficient magnetic circuit, and achieves lower power consumption at highspeed rotation, while at the same time striving to achieve a stable rotor position by preventing rotor float at highspeed rotation.

To solve for the above-mentioned problems, there is provided a highspeed motor comprising a stator including a stator yoke and coils each arranged on each of a plurality of salient poles on said stator yoke and a rotor rotatably arranged facing the salient poles of said stator by way of an air gap, stator yoke is constituted by a belt-shaped yoke forming ribbon, having a plurality of salient pole forming portions connected via magnetic connecting portions.

Further, the present invention is a directed to an highspeed motor comprising a stator including a stator yoke made of a soft magnetic material sheet and coils composed of magnetic wires wound on salient poles of said stator yoke; a rotor including a field magnet consisting of a permanent magnet so as to face said salient poles of said stator by way of an air gap and a shaft as the center of rotation in the center thereof; and a base plate having a bearing for rotatably holding said rotor in the center of said stator characterized in the stator yoke is constituted by winding a soft magnetic material sheet.

Further, the present invention is characterized in that there is provided on the opposite side of a salient pole of the stator yoke a protruding portion, which serves both to position and fix the stator.

Further, the present invention is characterized in that the height of the magnetic connecting portion for interconnecting salient poles of the yoke forming ribbon is less than one fourth of the height of a salient pole.

Further, the present invention is characterized in that the salient pole of the stator yoke is formed so that the width of the area facing the above-mentioned rotor is narrow on the motor shaft side, and becomes wider towards the outer circumference of the motor.

Further, the present invention is characterized in that the height of the salient pole of the stator yoke is formed so as to be higher on the side of the motor shaft, and to become lower towards the outer circumference of the motor.

Further, the present invention is characterized in that the above-mentioned stator yoke is fixed, via a bobbin wound with the above-mentioned coil, to the base plate, which supports a bearing of the above-mentioned rotor shaft.

DESCRIPTION OF THE PREFERRED EMBODIMENTS

The present invention will now be explained hereinbelow by reference to the drawings.

Figure 1:
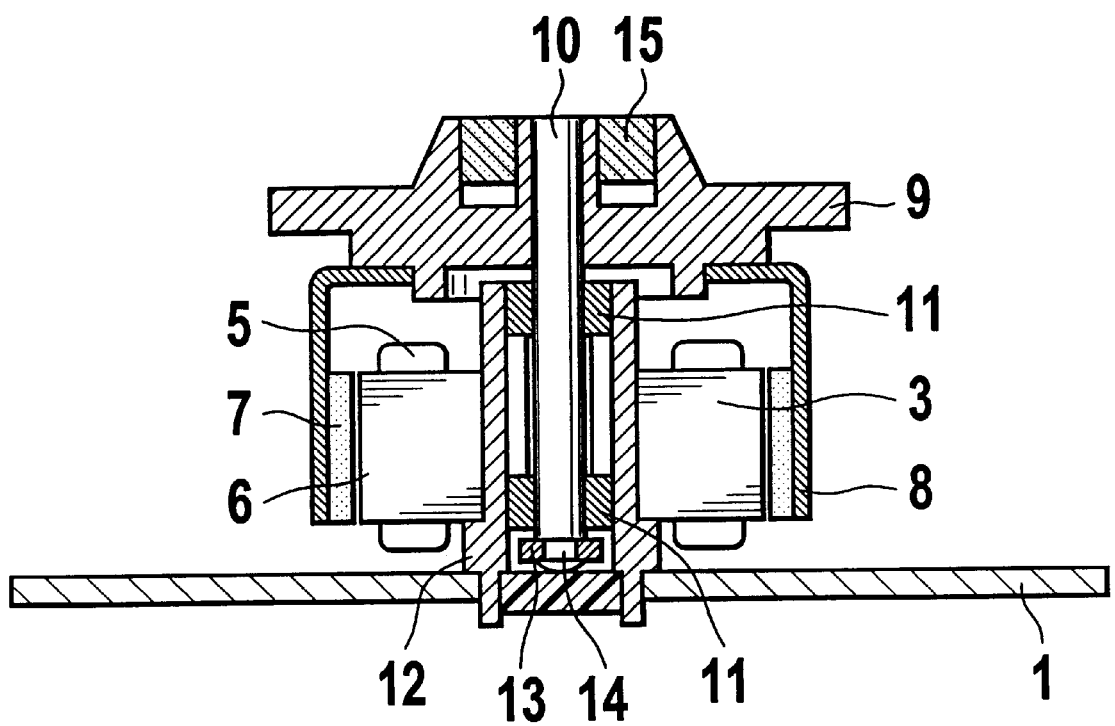
FIG. 1 is a cross-sectional view of a conventional outer rotor-type highspeed motor with radial gap.
Figure 2A:
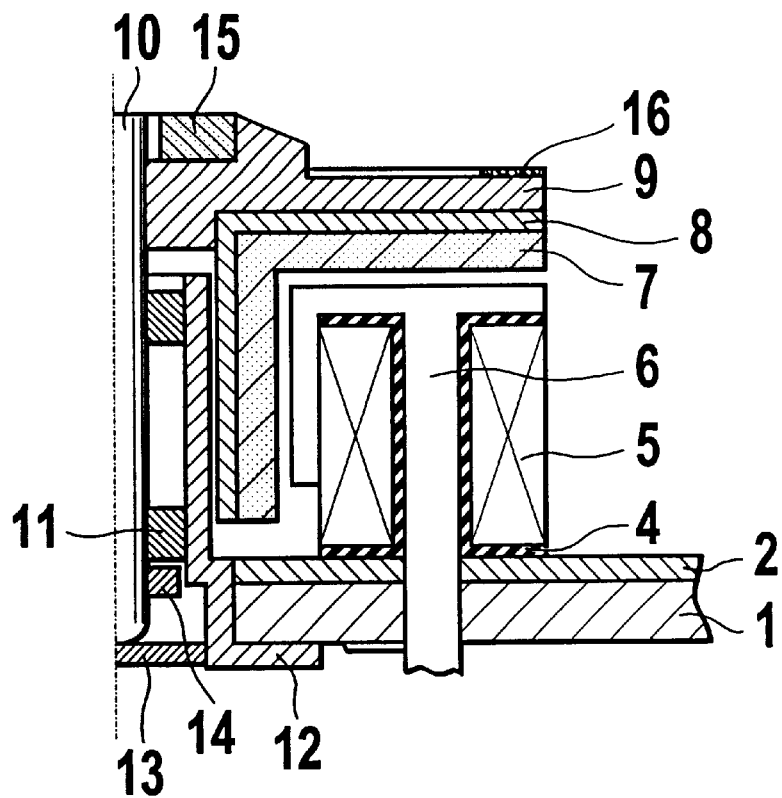
FIG. 2A is a cross-sectional view of a conventional highspeed rotary motor of salient pole-type with axial and radial air gap similar to the present invention.
Figure 2B:
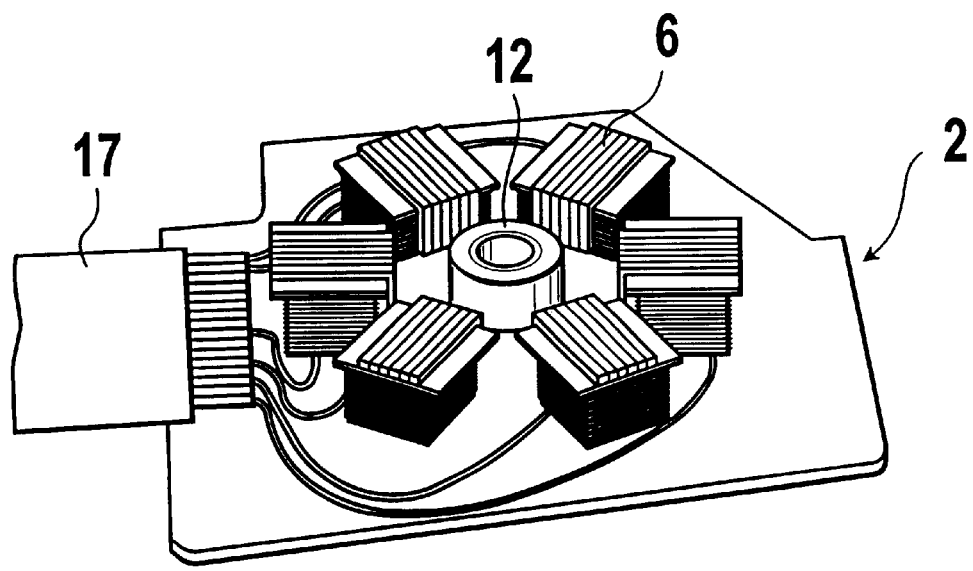
FIG. 2B is an oblique view of the stator of this motor.
Figure 3:
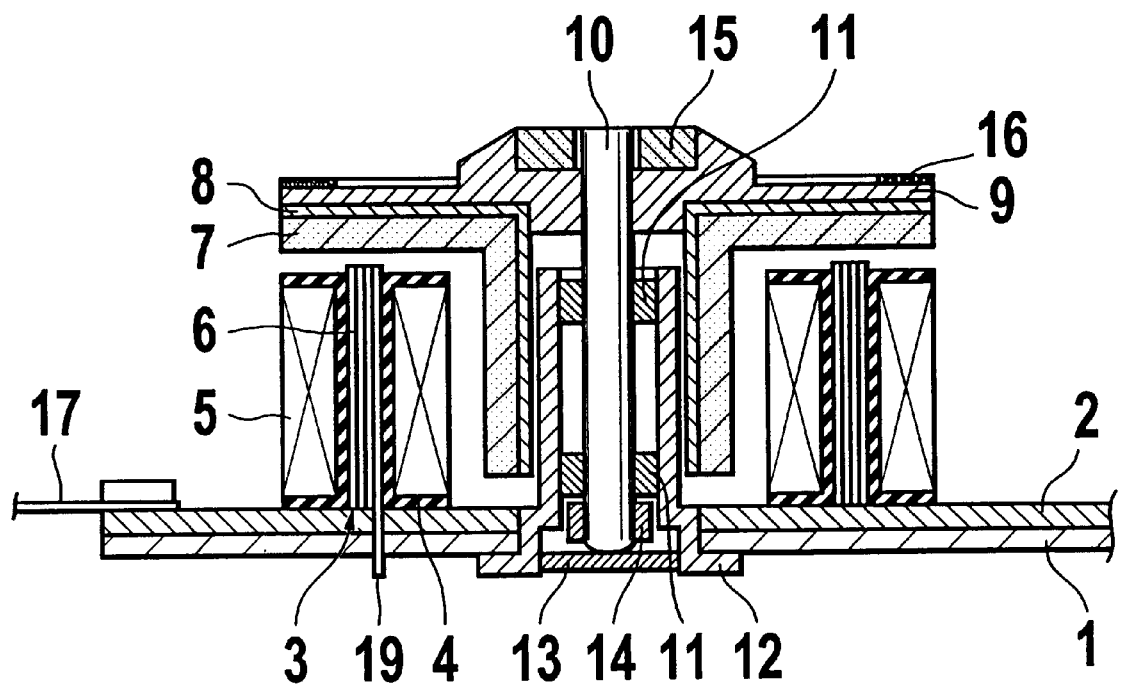
FIG. 3 is a cross-sectional view of a brushless DC motor for a CD-ROM salient pole-type with axial gap as one example of a highspeed motor according to the present invention.

FIG. 3 is a cross-sectional view of a brushless DC motor for a CD-ROM of salient pole-type with axial gap as one example of a highspeed motor according to the present invention.

A circuit board 2, with electronic components mounted thereon, is mounted on the upper surface of a base plate 1, comprising a soft-magnetic steel plate, the surface of which is rust-proofed via galvanization. A stator yoke 3 has on the upper side a salient pole 6, which is constituted by stacking in a winding fashion a thin, soft-magnetic material sheet (for example steel, silicon steel and pure iron etc.) and the portion 19 of the salient pole 6, which corresponds to the stator fixing portion 19 at the beginning of the winding or at the end of the winding, passes through the circuit board 2 and is fixed by caulking to the base plate 1. A driving coil 5 is constituted by winding a magnet wire around a bobbin 4 made of an insulating material (for example synthetic resin) and is inserted into the salient pole 6 of the stator yoke 3. There are a plurality of salient poles 6 as well as, driving coils 5 circumferentially and the respective terminals thereof are connected to a conductor formed on the circuit board 2.

A rotor magnet 7 opposes to the salient poles 6 of the stator yoke 3 by way of an air gap, and is affixed to a rotor yoke 8. A turntable 9 adapted to receive an optical disk is affixed to the upper surface of the rotor yoke 8, and in the center thereof is provided a shaft 10, which constitutes the center of rotation. A magnet 15 for clamping a disk is provided in the central portion of the turntable 9, and a tapered guide is provided on the periphery thereof to facilitate disk centering. On the periphery thereof, there is provided a ring-shaped piece of rubber 16, which increases frictional resistance to prevent disk slipping.

In the center portion of the base plate 1, there are provided two metal bearings 11 which hold a shaft 10 providing the center of rotation of the rotor, rotatably and coaxially with the stator yoke 3, and on the outer side thereof is a housing 12, which holds the metal bearings 11. At the base of the housing 12, there is a thrust pad 13, which props up the shaft 10 for determining the height of the turntable 9. A stopper 14 is press-fitted to the shaft 10, and prevents the turntable 9 from slipping out. On the peripheral portion of the circuit board 2, there is provided a connector 17 for electrical connection for energizing the motor driving coil 5, and the connector 17 is connected to an external motor driving circuit not shown in the drawing.

Figure 4:
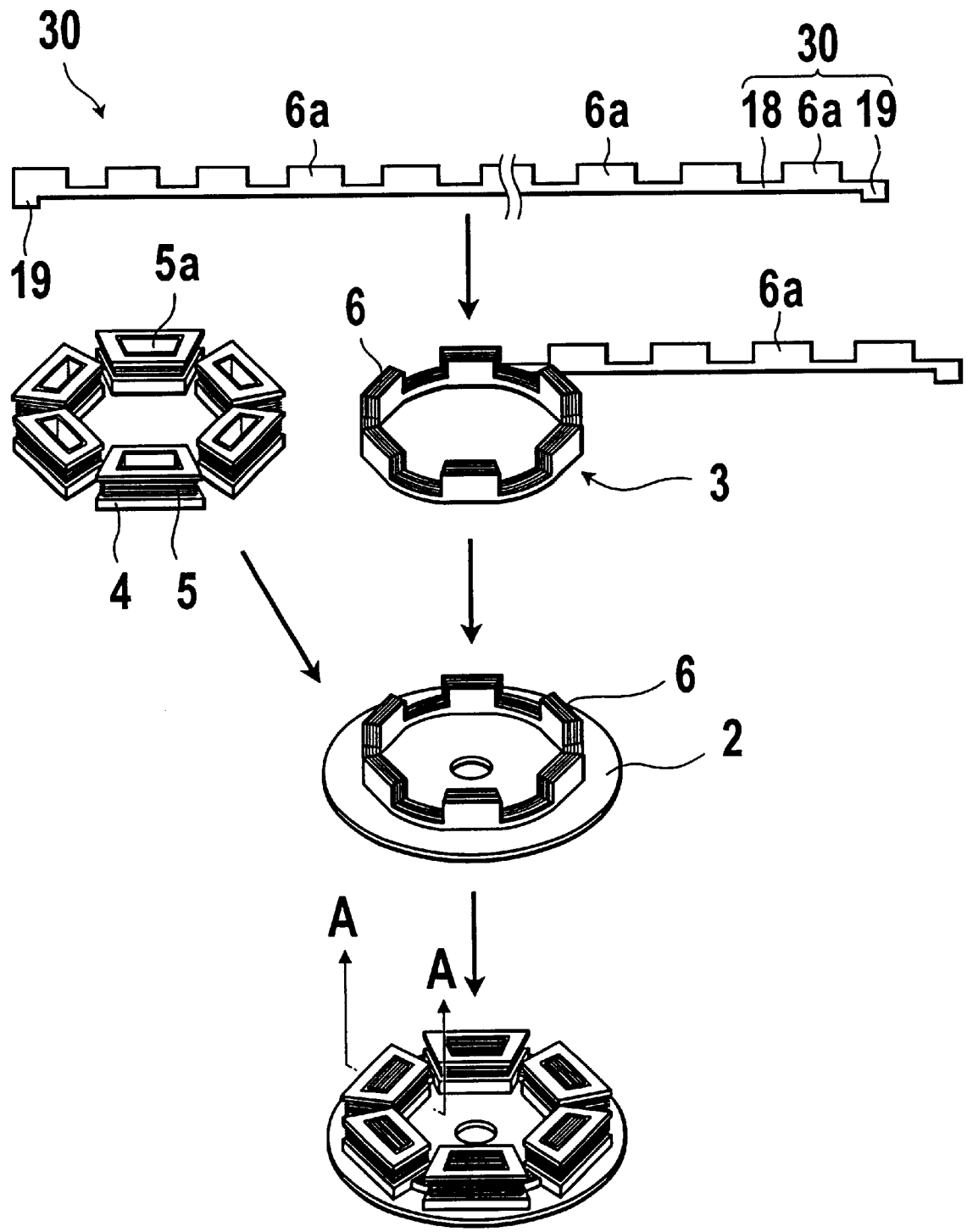
FIG. 4 shows fabrication steps of a stator yoke.

FIG. 4 shows fabricating steps of the stator yoke 3. As can be understood from FIG. 4, the stator yoke 3 is manufactured by rolling a belt-shaped yoke-forming ribbon 30 into a ring shape. The yoke-forming ribbon 30 is of a belt shape, in which salient pole-forming portions 6a of a given number (6 in the embodiment as shown) are connected via a magnetic connecting portion 18 whose height is less than one fourth of the height of the salient pole 6a, and at both ends thereof, which correspond to the beginning and the end of the winding. Protruding portions 19, i.e. stator fixing portions 19 are provided on the opposite side of the salient pole forming portions 6a. The stator fixing portions 19 serve both positioning and fixing the stator yoke 3 to the base plate 1. The stator yoke 3 is manufactured by rolling the belt-shaped yoke-forming ribbon 30 into a ring shape, and the salient pole-forming portions 6a are stacked together to form a given number of salient poles 6. Making the height of the magnetic connecting portion 18 less than one fourth of the height of the salient pole 6a still enables assurance of sufficient magnetic flux density from the magnetic connecting portion 18, and also facilitates rolling the yoke-forming ribbon 30 into a ring shape when manufacturing the stator yoke 3, and makes it possible to lighten the stator yoke 3, while simultaneously cutting back on material costs.

A stator assembly is constituted by mating a hole 5a of a separately prepared coil 5 wound around a bobbin 4 to a salient pole 6 of the stator yoke 3 formed as described above. If the shape of the salient pole 6 is formed into a near trapezoidal shape here so that the width of the inner circumference side of the salient pole 6 (the motor shaft side) is narrow, and becomes wider toward the outer circumference side, it is possible to provide matching to the shape of magnetic pole of the field magnet with the result that magnetic linkage flux will be increased. Further, it is also possible to vary cogging torque and other motor characteristics by slightly deforming this shape. A soft magnetic material (for example steel, silicon steel etc.) plate was used for the base plate 1 in the embodiment as above exemplified, but non-magnetic material may be used. In particular, use of an aluminum material provides lighter weight and better heat radiation which enables improved motor characteristics.

Figure 5A:
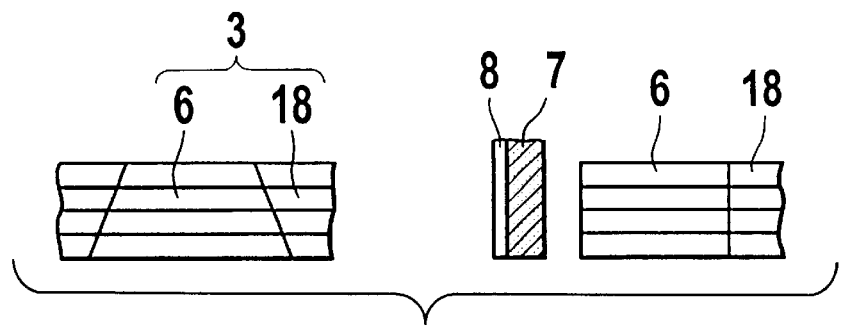
FIGS. 5A, 5B and 5C show respective examples of shapes of the salient pole a stator yoke.
Figure 5B:
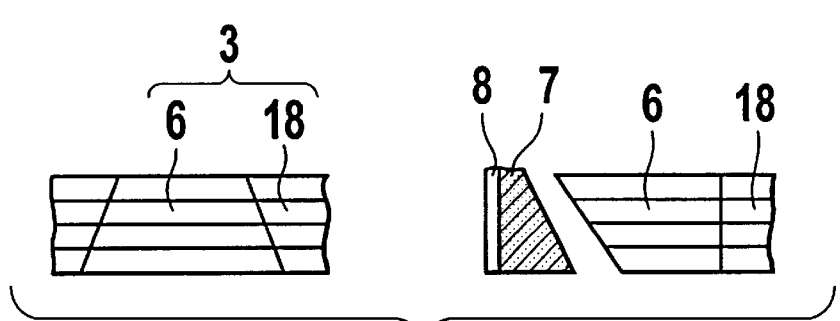
Figure 5C:
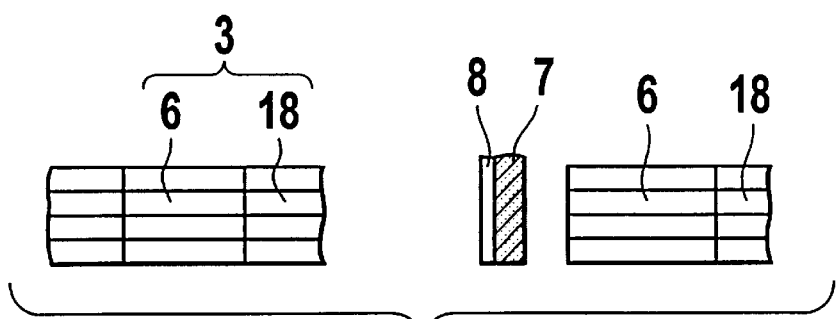

FIGS. 5A, 5B and 5C show examples of shapes of the salient pole 6 of the stator yoke 3. FIG. 5A is an example of a substantially trapezoidal shape whose width widens toward the outer circumference. This is effective in increasing the area facing the rotor magnet 7, and creating an abundance of effective magnetic linkage flux. In the example shown in FIG. 5B, the width of the salient pole 6 increases toward the outer circumference similar to FIG. 5A, but the height of the salient pole 6 becomes lower toward the outer circumference of the motor, and the thickness of the rotor magnet increases. This enables the realization of a rotor magnet thickness that matches magnetic pole pitch, and even more abundant effective magnetic linkage flux. FIG. 5C shown an example in which the salient pole 6 is made into a rectangular parallelepiped shape which enables shimplification of the shape of the bobbin.

Figure 6:
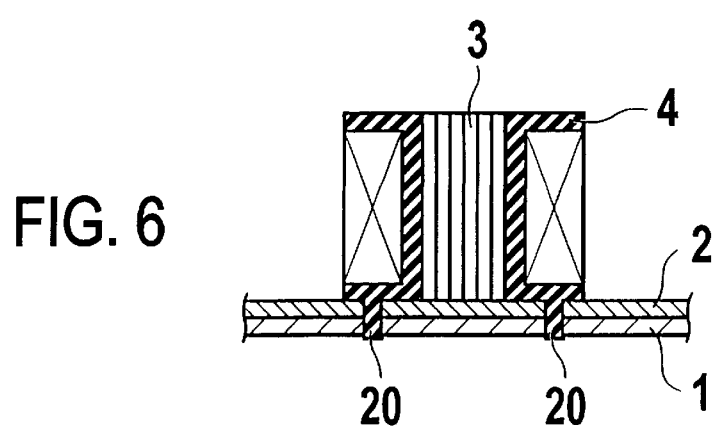
FIG. 6 is an A—A cross-sectional view of FIG. 4.

FIG. 6 is a cross-sectional view taken along the line 6—6 in FIG. 4, which shows a fixing method for the stator yoke 3.

In the fixing method, a protruding portion 20 is provided on the end face of the side of the bobbin 4 facing the base plate 1, and after interposing the bobbin 4 onto the stator yoke 3 beforehand, the protruding portion 20 of the bobbin 4 is inserted into the base plate 1, and then the salient poles 6 are positioned and fixed. Either press fitting or hot caulking may be applied. Further, there can be either one or two protruding portions 20. Naturally, less number of protruding portions makes working easier.

Figure 7A:
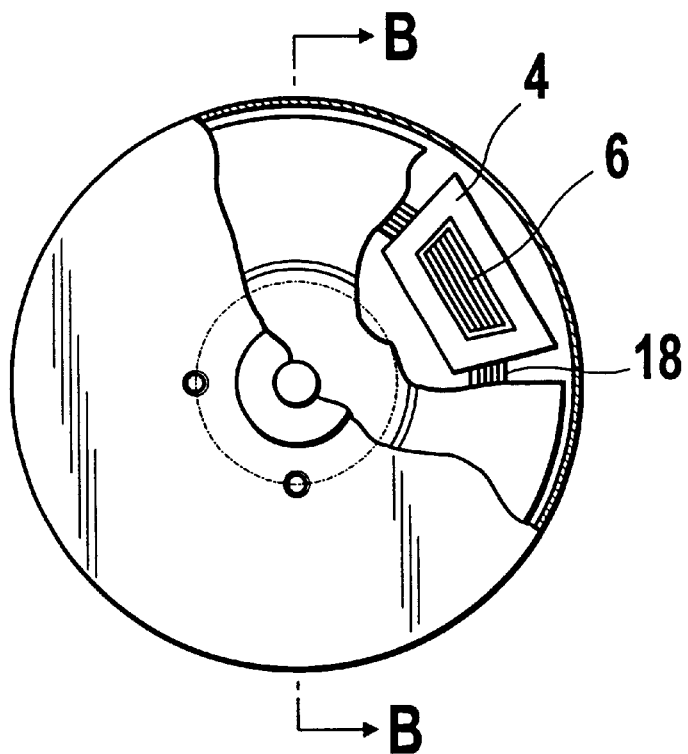
FIGS. 7A and 7B show another embodiment of a brushless DC motor of salient pole-type with axial air gap as an example of a highspeed motor according to the present invention, with FIG. 7A being a front view showing portion of the case cut away to show a cross section, and FIG. 7B being an B—B cross-sectional view of FIG. 7A.
Figure 7B:
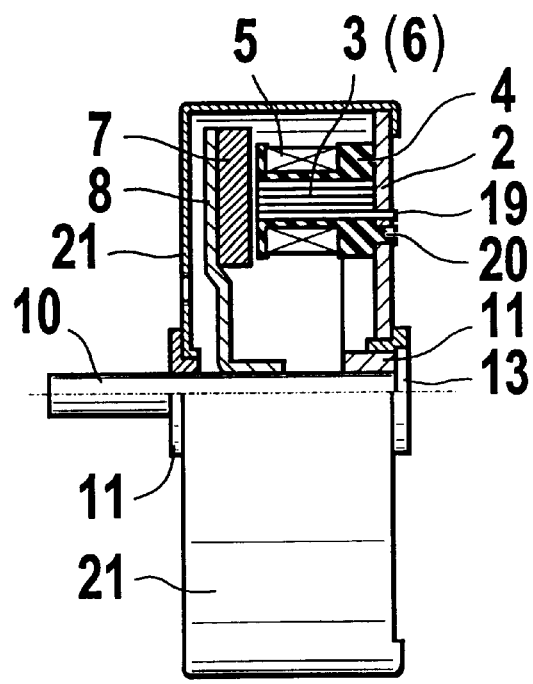

FIGS. 7A and 7B show another embodiment of a brushless DC motor of salient pole-type with an axial air gap as an example of a highspeed motor according to the present invention. FIG. 7A is a front view in which the case is partially cut away to show the cross section thereof, and FIG. 7B is a cross-sectional view taken along the line 7B—7B in FIG. 7A.

With the aim of reducing parts, the circuit board 2 also serves as the base plate 1. Further, the bearing 11 is of a twin structure, and is designed to increase rigidity relative to load in the radial direction. In a conventional highspeed motor with a radial air gap, a washer is provided between the rotor yoke 8 and the case 21 to reduce frictional load at contact, but in the embodiment as shown, there is practically no play in the axial direction, eliminating the need for a washer, because the rotor magnet 7 is constantly attracted to the side of the stator yoke 3.

In a conventional highspeed motor of outer rotor-type with a radial air gap, there is no room for improving winding operation efficiency, or enhancing quality, because the stator yoke is directly wound with magnet wire due to the difficulty of using a bobbin for the winding. Further, with a salient pole-type axial air gap, magnetic resistance becomes great, and it is impossible to enhance magnetic efficiency to improve motor characteristics, because the respective salient poles are provided independently, and the magnetic circuit thereof is constituted via a base plate. However, according to the present invention, it is possible to provide, at low cost, a high-performance motor, which gives off lower temperature rise, strives for a more highly efficient magnetic circuit, and achieves lower power consumption at highspeed rotation, while at the same time striving to achieve a stable rotor position by preventing rotor float at highspeed rotation.

What is claimed is:

1. A highspeed motor comprising a stator including a stator yoke made of a soft magnetic material and coils comprising magnet wires wound on a bobbin arranged on salient poles of said stator yoke; a rotor, rotatably arranged on a motor shaft, including a field magnet comprising a permanent magnet so as to face said salient poles of said stator in an axial direction by way of an air gap and a shaft as the center of rotation in the center thereof; and a base plate having a housing which has two bearings for rotatably holding said rotor in the center of said stator, wherein said stator yoke comprises a wound continuous ribbon, wherein each of said salient poles is formed so that an area is formed facing said field magnet wherein a width of said area facing said field magnet is narrow on a motor shaft side, and becomes wider towards an outer circumference of the motor, wherein a protruding portion on said wound continuous ribbon, which serves both to position and to fix said strator, is provided on a side opposite said area facing said rotor and wherein said stator yoke is fixed by way of a portion of said bobbin to said base plate.

2. The motor according to claim 1, wherein said ribbon is formed with a plurality of salient pole-forming portions, wherein the salient pole-forming portions are respectively connected via magnetic connecting portions thereof and wherein a height of said magnetic connecting portions of said continuous ribbon, is less than one fourth a height of said pole-forming portions of said continuous ribbon.

3. A highspeed motor according to claim 1, wherein said portion of said bobbin is a protruding portion formed on an end face of the bobbin facing said base plate.

4. A highspeed motor according to claim 1, wherein said continuous ribbon is formed with a plurality of magnetic connecting portions to provide magnetic interconnection between adjacent salient poles.

5. A highspeed motor according to claim 1, wherein said continuous ribbon is formed with a plurality of salient pole-forming portions, wherein the salient pole-forming portions are respectively connected via magnetic connecting portions thereof, and wherein a protruding portion is provided on a side opposite to said salient pole forming portions on at least one end of said continuous ribbon.

6. A highspeed motor comprising a stator including a stator yoke made of a soft magnetic material and coils comprising magnet wires wound on a bobbin arranged on salient poles of said stator yoke; a rotor including a field magnet comprising a permanent magnet facing said salient poles of said stator in an axial direction by way of an air gap and a shaft as the center of rotation in the center thereof; and a base plate having a housing which has two bearings for rotatably holding said rotor in the center of said stator, wherein said stator yoke comprises a wound continuous ribbon, wherein each of said salient poles is formed so that an area is formed facing said field magnet, wherein a width of said area facing said field magnet is narrow on a shaft side, and becomes wider towards an outer circumference of the motor, wherein a protruding portion on said wound continuous ribbon, which serves both to position and to fix said stator, is provided on a side opposite said area facing said rotor and wherein said stator yoke is fixed by way of a portion of said bobbin to said base plate; and, wherein a height of each of said salient poles is formed so as to be higher in an axial direction on a side facing the shaft, and to gradually become lower towards the outer circumference of the motor.

7. The motor according to claim 6, wherein a height of said stator yoke between said salient poles of said stator yoke in an axial direction, is less than one fourth a height of said salient poles in an axial direction.

8. A highspeed motor according to claim 6, wherein said portion of said bobbin is a protruding portion formed on an end face of the bobbin facing said base plate.

9. A highspeed motor according to claim 6, wherein said continuous ribbon is formed with a plurality of magnetic connecting portions to provide magnetic interconnection between adjacent salient poles.

10. A highspeed motor according to claim 6, wherein said continuous ribbon is formed with a plurality of salient pole-forming portions, wherein the salient pole-forming portions are respectively connected via magnetic connecting portions thereof, and wherein a protruding portion is provided on a side opposite to said salient pole forming portions on at least one end of said continuous ribbon.

* * * * *